United States Patent [19]
Chen et al.

[11] Patent Number: 5,502,724
[45] Date of Patent: Mar. 26, 1996

[54] COMMUNICATION MEDIUM ACCESS CONTROL PROTOCOL FOR WIRELESS COMMUNICATION

[75] Inventors: Jeane S. Chen, Ossining, N.Y.; Stanley L. Frickes, San Jose, Calif.; Bryan R. Hartlen, Oshawa, Canada; Tom D. Kurata, Saratoga, Calif.; Jacek P. Maryan, Mississauga; Dan N. McKay, Don Mills, both of Canada; Timothy F. Williams, Mahwah, N.J.

[73] Assignee: International Business Machines Corporation, Armonk, N.Y.

[21] Appl. No.: 338,715

[22] Filed: Nov. 14, 1994

[30] Foreign Application Priority Data

Nov. 15, 1993 [CA] Canada ................................. 2103134

[51] Int. Cl.$^6$ .......................... H04L 12/413; H04B 7/204
[52] U.S. Cl. ........................................ 370/85.3; 370/95.1
[58] Field of Search ................... 370/85.1, 85.2, 370/85.3, 85.4, 85.5, 85.15, 94.1, 94.2, 95.1, 95.3, 110.1, 85.7

[56] References Cited

U.S. PATENT DOCUMENTS

| | | | |
|---|---|---|---|
| 4,689,785 | 8/1987 | Toyonaga et al. | 370/85.3 |
| 5,121,382 | 6/1992 | Yang et al. | 370/85.3 |
| 5,274,841 | 12/1993 | Natarajan et al. | 370/85.3 |
| 5,369,639 | 11/1994 | Kamerman et al. | 370/85.3 |
| 5,379,290 | 1/1995 | Kleijne | 370/85.2 |
| 5,422,887 | 6/1995 | Diepstraten et al. | 370/85.3 |

*Primary Examiner*—Wellington Chin
*Attorney, Agent, or Firm*—Andrew J. Dillon; George E. Grosser

[57] ABSTRACT

A method is provided for controlling access to a communication medium intended for sharing by a least two stations to enable peer-to-peer communications therebetween. Initially, the communication medium is sensed at a first station to determine if the medium is in use. If the first station senses that the medium is not in use, the first station may then transmit a connection request message intended for a second station. Upon receiving at the second station the connection request message, the second station transmits a connection confirm message to the first station for the purpose of establishing a reservation of the transmission medium for use by the first and second stations. Thereafter, the first station transmits information as one or more data messages from the first station to the second station. Upon receiving the last of the data messages from the first station, the second station transmits an acknowledgement message to the first station. The first station, upon receiving the acknowledgement message, subsequently transmits a disconnect request message to the second station. Upon receiving the disconnect request message, the second station subsequently transmits a disconnect confirm message for reception by the first station for the purpose of ending the reservation of the medium.

22 Claims, 6 Drawing Sheets

Common Header

CR

CC

XFR

XAK

DR

DC

COMMUNICATION MEDIUM ACCESS CONTROL PROTOCOL FOR WIRELESS COMMUNICATION

BACKGROUND OF THE INVENTION

1. Technical Field

Present invention generally relates to methods for transferring data between multiple independent stations. More particularly, the present invention relates to data transfer in a local area network between a number of data processing devices—such as personal computers, lap top computers, or palm top computers—where the devices use a wireless media—such as infrared, radio frequency or microwaves—or interconnecting cable, if desired.

2. Description of the Related Art

There are a number of techniques for communicating between independent data processing stations using well known medium such as infrared or radio frequency.

In an article entitled "A New Channel Access Message For Packet Radio," which was published in the proceedings of the ARRL Ninth Computer Networking Conference, London, Ontario, Canada, Sep. 22, 1990, ISDN0-87259-337-1 by Phil Karn, there is disclosed a channel access method for use by multiple packet radio stations on a shared simplex packet radio channel which permits different stations to initiate independent access to the channels and initiate conversations with other stations. The article proposes a technique for multiple access with collision avoidance to reduce the interference of stations with each other. However, there is no disclosure of any message for providing fairness of access to maximize the utilization of the medium by each station and reduce the waiting of each station for access to the medium; and there is no mechanism for making medium reservations between stations, nor is there a mechanism for terminating conversations.

U.S. Pat. No. 5,231,634, issued Jul. 27, 1993 and assigned to Proxim, Inc., discloses a medium access protocol for wireless LAN which requires a station intending to initiate communications to send reservation duration information in its request to the intended receiving station to reserve a fixed block of time for its proposed communications or conversation. This may pose some problems as there is no allowance provided for retries, and if there is a problem in communications, a new reservation is required which may necessitate delays because other stations may have initiated communications at the end of the reservation.

U.S. Pat. No. 4,661,902, issued Apr. 28, 1987 and assigned to Apple Computer, Inc., discloses a local area network with carrier sense collision avoidance. However, it does not disclose a means by which the stations not involved in the conversation acknowledge and obey a conversation reservation. The system disclosed is a hardwired system which does not address the problem of "hidden terminals," and can therefore depend wholly upon Carrier Sense Multiple Access With Collision Avoidance (CSMNCA). This reference shows the initiation of conversations by the transmission of a request to send message by the transmitting station and a clear to send message sent back to the transmitting station by the intended receiving station. The non-conversant stations perform a carrier sense to detect when the communication medium is free for their use. Thus, they are free to try to initiate conversations during the conversations of other stations.

Unlike a wired environment, in a wireless environment-such as infrared or radio frequency—not all stations are able to hear all the other stations. This is referred to as the "hidden terminal" problem. The problem with hidden terminals is that they need to be made aware of the reservation effected by a communicating pair of stations so that they do not interrupt the conversation and cause a collision. This problem occurs in wireless local area networks (LANs), as it is possible for one or more station (or terminal) to be intermittently shielded from the others—for instance, by being moved or by the interposition of an obstruction. This is particularly important in a portable environment, as a portable station, such as a lap top or palm top, are quite mobile and may move out of range.

SUMMARY OF THE INVENTION

The foregoing and other problems are overcome by the method of the invention disclosed and claimed herein which provides a method of controlling peer-to-peer communications in networks where all stations or nodes are equally able to communicate with all other stations within range of their communications capability. The transmission medium to which this invention pertains may include infrared light, radio frequency, ultraviolet, or other electrical magnetic media. In the peer-to-peer communications to which this invention relates, the stations are typically, but not necessarily, in a local area network, and usually communicate on the same channel or frequency.

The invention provides a protocol for communication including:

reserving the media;

sending data;

receiving data;

preserving fair access to the media; and reconciling collisions and other error conditions.

The invention provides a method for controlling access to communications medium shared by at least two stations to provide peer-to-peer communication there between. Communicating a message includes the steps in which the intended initiating station—a first station—senses the communication medium to determine if a communication medium is in use. If the first station finds that the communication medium is not in use, it transmits a connection request (CR) message directed to a second station. The message includes identification information of the first station. The receiving, or second station, receives the connection request message and transmits a connection confirm (CC) message which is intended for receipt by the first station. The connection confirm message includes identification of the second station and is intended to establish a reservation of the transmission medium for the communication of messages between the first and second station. Other stations(e.g., a third station) may receive the connection request or the connection confirm message, depending upon whether or not the other stations are fully connected, or are partially hidden. If they are close enough to the sending and receiving station fully connected, they will receive both the connection request and connection confirm messages.

Upon receipt of either the connection request or the connection confirm messages, the third station transitions into a wait state having a preselected time period during which the third station does not transmit messages on the medium until it detects the expiration of the reservation between the first and second stations by detecting a disconnect request (DR) message or a disconnect confirm (DC) message from said stations. If the wait state expires before the third station detects a disconnect request or disconnect confirm message, it will perform a carrier sense to determine if the medium is in use. If the medium is not in use, the third station returns to an idle state. If the medium is in use, the third station returns to a wait state having a predetermined period.

During the reservation or conversation between the first and second stations, the first station may transmit one or more data messages (XFR) to the second station. These messages may include multiple transmissions, and the second station may, upon receiving the last message, send an acknowledgement (XAK) message back to the first station where such an XAK message includes information identifying what data frames were received successfully. The first station, upon receiving an acknowledgment from the second station that one or more of the messages were not successfully received, may retransmit the unsuccessfully received data messages to the second station. The second station, upon receiving the last of the retransmitted data messages, may send a retry acknowledgment message to the first station where such an retry acknowledgment message includes information identifying which data messages were received successfully. The first station receives the retried acknowledgement message. If the acknowledgement message indicates that the transmission was still unsuccessful, then it may be necessary for the first station to retry sending the complete message at a later time; basically establishing another reservation.

The implementation of the invention herein may be achieved by software (e.g. routines or device drivers) or microcode at each station. Alternately, hardwired circuitry may be employed to implement the invention herein. These techniques will be apparent to those skilled in the art to which this invention relates.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENTS

DATA REFERENCES

| | |
|---|---|
| Data Packets | Actual data to be transmitted. |
| Segments | Pieces of a Data Packet. The sum of all the segments will form the original Data Packet. |
| Frames | Encapsulated segments that are actually transmitted over the medium including Segments plus protocol frame fields. |
| Fields | Portions of frame having defined uses. |

TRANSMISSION REFERENCES

| | |
|---|---|
| Broadcast | A frame that is sent to all stations and processed by all stations. |
| Addressed | A frame that is addressed to a specific station and processed only by that station. |
| Directed Broadcast | A frame that is sent to all stations but only acted upon by the station to which it was directed. |

Figure 1:
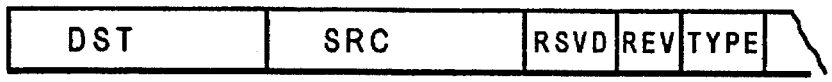
FIG. 1 is a drawing of message frame contents used in communications according to the invention herein.
Figure 1:
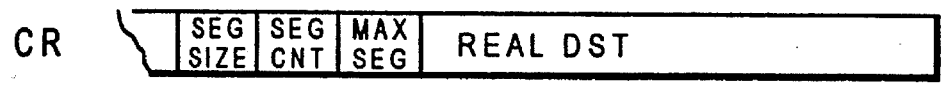
Figure 1:
Figure 1:
Figure 1:
Figure 1:
Figure 1:

Referring to FIG. 1, it can be seen that the present invention transmits messages or data in data packets, typically known as "frames." The use of such frames for data transmission is well known. In the frames used in accordance with the described embodiment of the invention, each of the message frames includes a commonly structured header having the following fields:

The first field (DST) of the header comprises the Destination Station's address, which may be a broadcast, or a unique station address.

The second field (SRC) comprises the initiating station's address.

The third field (RSVD) is optional and may be reserved for other information.

The fourth field (REV) is also optional and may be used, for instance, to identify the version of the communication protocol used.

The fifth field (TYPE) identifies the type of frame (e.g., CR, CC, etc. . . . ) as described below.

There are six basic communication message types used in practicing the present invention. These message types are listed and described below. Each one uses the common header described above.

The Connection Request frame (CR) includes the following fields:

SEG SIZE which identifies the maximum size of the data field within the XFR frame (described below) to be used within the requested conversation which is to follow.

SEG CNT identifies which packet in a series of packets is being transmitted.

MAX SEG identifies how many XFR frames will be transmitted by the initiating station during the requested conversation.

REAL DST is the specific address for the targeted station with which a conversation is to be initiated.

The Connection Confirm frame (cc) includes the same SEG SIZE, SEG CNT, AND MAX SET fields and information as the Connection Request frame does; however, the REAL DST frame contains the specific address of the initiating station.

The Data Transfer frame (XFR), which is adapted to transfer the data or information from the initiating station to the receiving station, includes the following fields:

SEG CNT, MAX SEG, RSVD, and Data which have been defined previously in relation to the CR?CC frames and the header.

The Transfer Acknowledgement frame (XAK) contains a number of fields (in this case 3) which are used to identify which XFR frames have been received successfully or not.

The Disconnect Request frame (DR) includes a REAL DST field to identify the specific address for the targeted receiving station with which a conversation has been occurring; a number of fields (RSVD) for optional purpose.

The Disconnect Confirm frame (CC) includes a REAL field containing the specific address of the initiating station.

Figure 2:
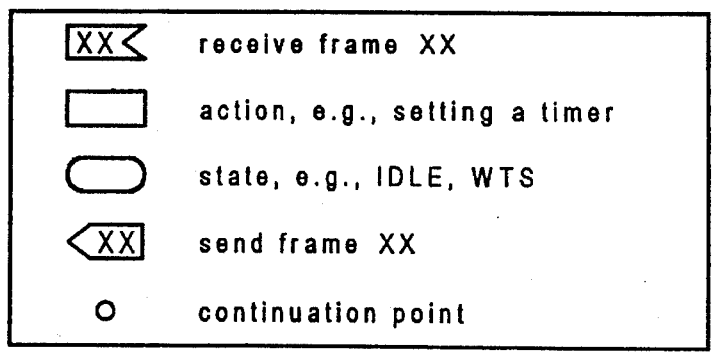
FIG. 2 is a drawing showing reservation based conversation flow without retry.
Figure 2:
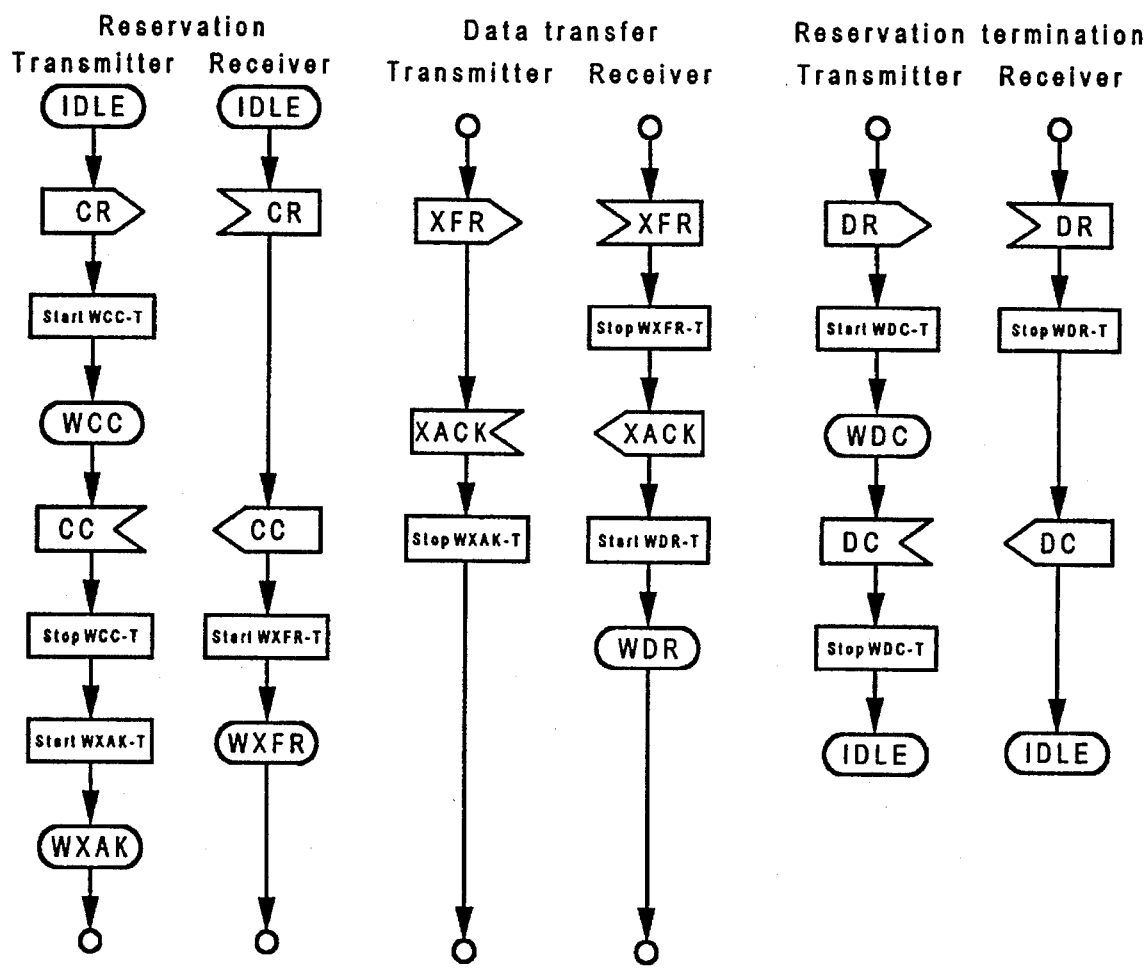

FIG. 2 depicts initiation of communications between two stations in a communication network in accordance with one embodiment of the present invention. Reservation of the medium, data transfer and termination of the reservation, and communications between the first and second station will be described.

Assuming for the purposes of this illustration that the transmission medium is unoccupied for the time being, and station one—which is identified as the transmitter in FIG. 2—and station 2—which has been identified as the receiver in FIG. 2—are both in the idle state. To initiate a conversation, station 1 sends out a connection request on the medium directed to station 2 and then enters a wait state, WCC, awaiting confirmation of receipt of the connection request from station 2. Upon receipt of a connection confirm message cc from station 2, station 1 changes wait states from WCC to the WXAK state.

In order to transfer data, station 1 transmits an XFR frame (containing data as described above) directed to station 2, which receives it and sends back an acknowledgment XAK, which station 1 receives. Station 2 transitions into a wait state WDR awaiting a disconnect request DR.

To terminate a communication reservation, station 1 transmits a disconnect request DR, which is received by station 2. Station 1 awaits a disconnect confirm DC from station 2. Upon receiving such a disconnect confirm DC from station 2, station 1 returns to an idle state. Station 2 returns to an idle state upon transmitting the disconnect confirm DC message to station 1.

Figure 3:
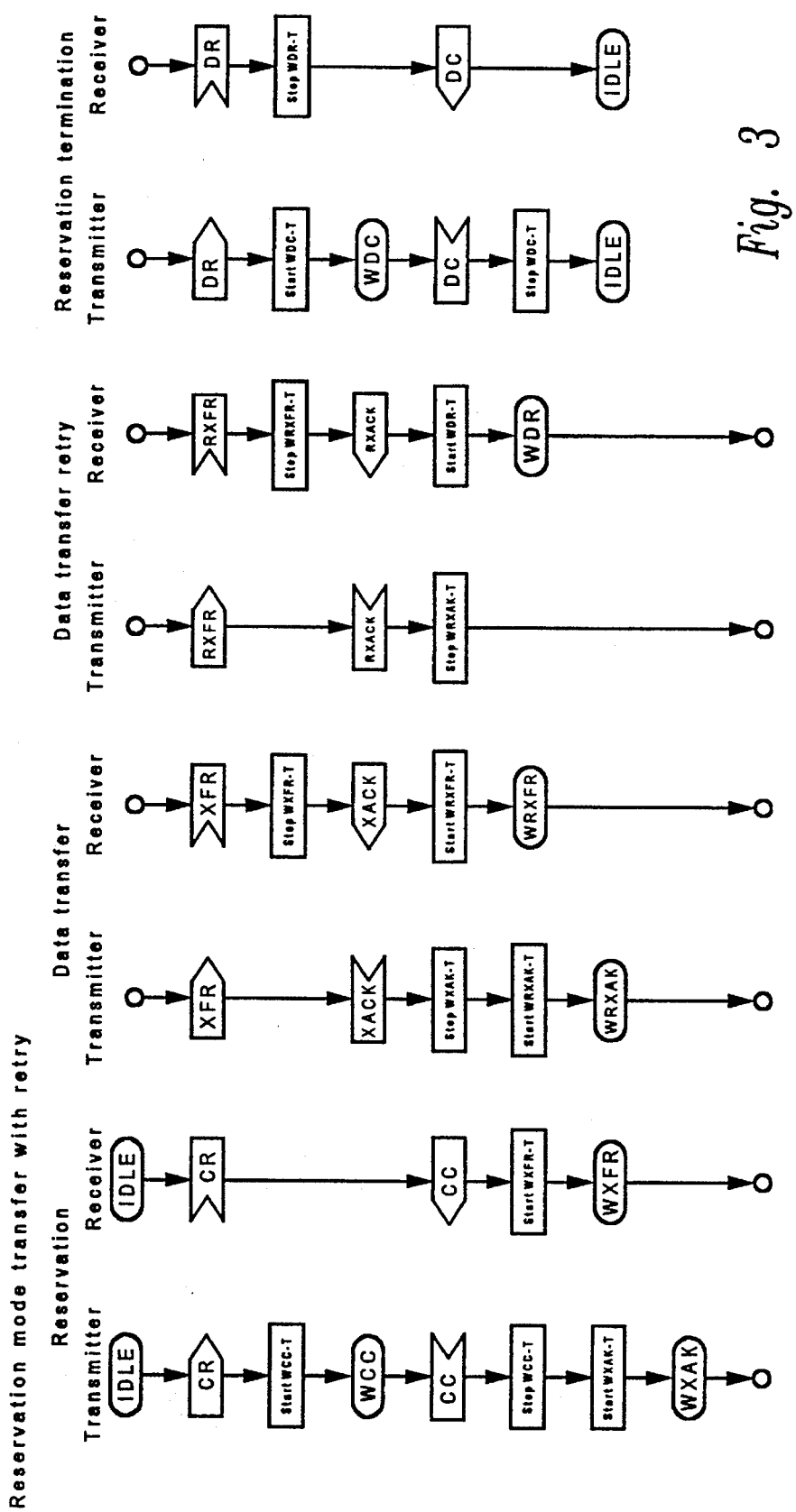
FIG. 3 is a drawing showing reservation based conversation flow with retry.

Referring to FIG. 3—which depicts the progression of a conversation from initiation to termination with retry from an incomplete message or data transmission—it can be seen that the initial reservation sequence and the first date transmission sequence are the same as depicted in FIG. 2. However, the subsequent data transfer steps differ slightly, given the selective retransmission of XFR frames that were received incomplete, with errors, or not received at all.

The initiating station, upon receiving an XAK frame from the receiving station containing non-zero MSK fields, indicates one or more failed XFR frames and enters a retransmission cycle RXFR, in which it resends the XFR frames indicated by the MSK fields in the XAK frame.

After receiving the last retransmitted frame (RXFR frames), the reservation of the medium is terminated in the same manner as described with respect to FIG. 2.

Figure 4:
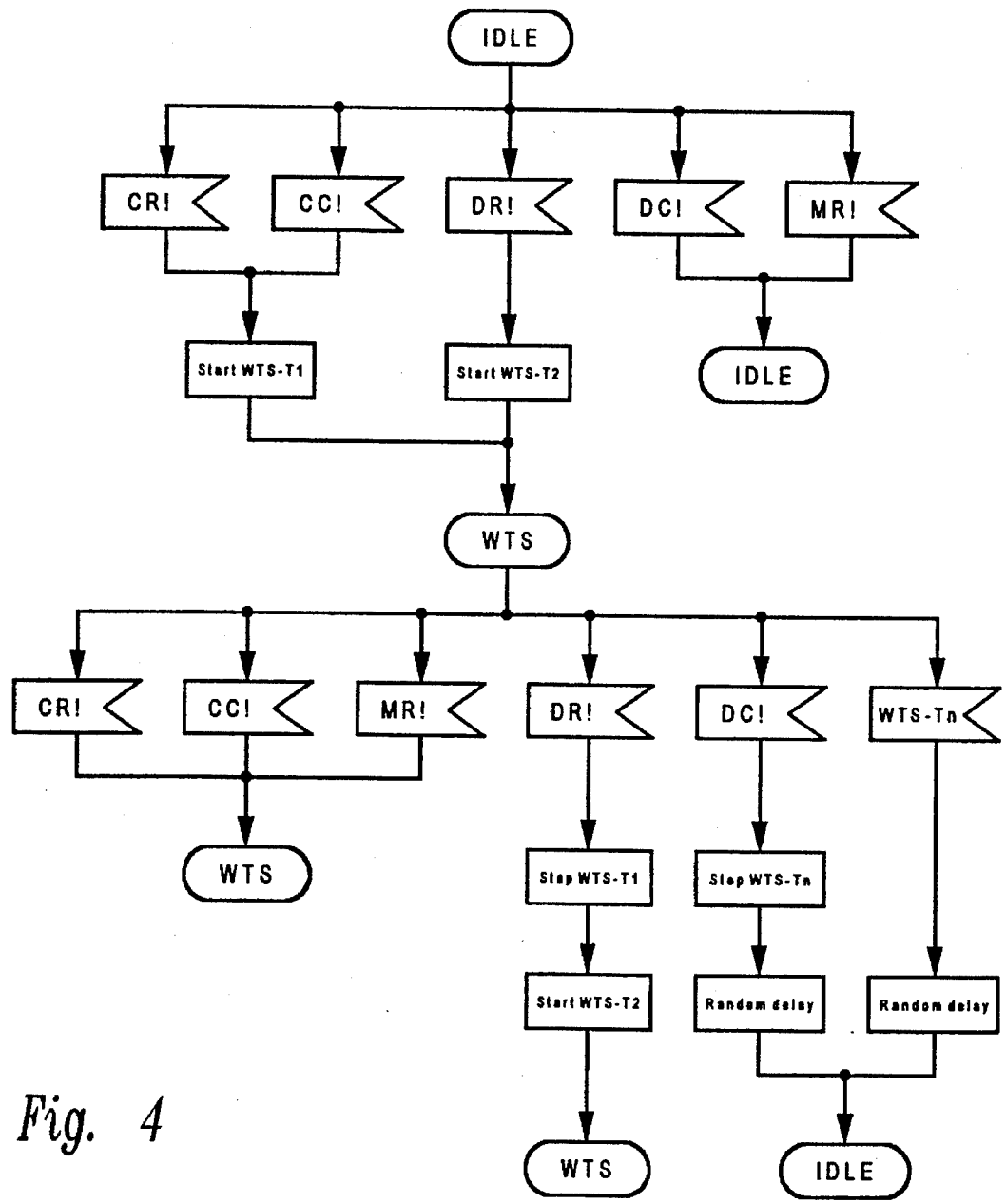
FIG. 4 is a drawing showing nonparticipating station flow.

FIG. 4 illustrates the possible transitions between states in a third station, which is a station not participating in the conversation between the aforementioned initiating (first station) and receiving stations (second station).

The transition indicated is designed to assure that the third station will not interfere with a reservation being established, and will be able to re-enter the contention period for use of transmission medium only after receiving reservation termination frames (DR, DC), Or following the elapse of the appropriate safety timer (WTS-T1, WTS-T2, WTS-Tn).

The random delays indicated in FIG. 4 are intended to achieve fairness in medium access among contending stations following the termination a reservation.

Figure 5:
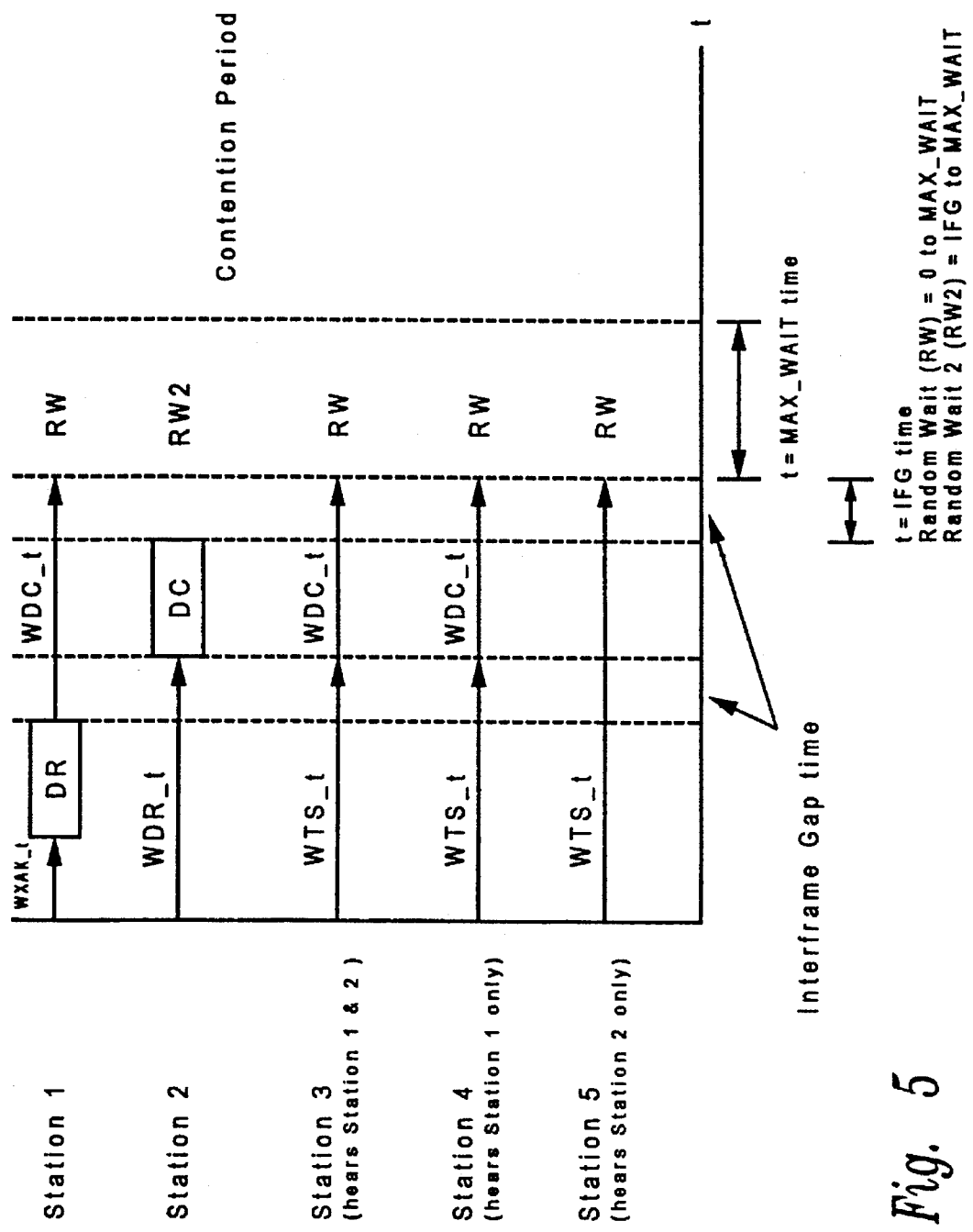
FIG. 5 is a drawing showing typical timing of network accessing.

Referring to FIG. 5, there is depicted how one embodiment of the protocol of the present invention achieves fairness in medium contention for all participating stations. Before entering contention for the medium, every station waits for a random amount of time.

As can be seen, some stations may be partially hidden, or not hidden, from the transmissions of conversing stations 1 and 2.

Station 1, 3, 4, and 5 will wait a random time between zero and a maximum backoff time less interference gap time. Station 2 will wait a random time between interframe gap time and maximum backoff time.

These random intervals will equalize the opportunity amongst the stations to initiate conversations. The advantage that station 2 has is neutralized by imposing the randomization from a non-zero base.

The randomization of delay timer may be achieved in various ways. For instance, programs or hardware in each station may generate a random number that is used to derive a corresponding random time delay. The maximum time delay is chosen to minimize the chance that more than one station entering the contention period (contending with each other) at the same time, and to minimize the amount of idle medium time between conversations.

Occasionally, even with the randomizing techniques for obtaining fairness and avoiding more than one station attempting to initiate a conversation at the same time, a collision may occur when two stations send a connection request simultaneously. In this situation, stations within range of both initiating stations will be unable to process either connection request due to errors caused by the presence of the conflicting signals simultaneously on the medium, and these stations will remain in their current states. Partially hidden stations (i.e., stations receiving either one of said connection requests, while not being targeted by said requests) will transition into a wait state (see WTS timeout in FIG. 4) in anticipation of an impending conversation. After a random delay these stations will time-out and transition to an idle state.

The two colliding, initiating stations await receipt of connection confirm frames from their intended receiving stations in a wait state, WCC, which is shorter than WTS timeout of the non participating stations. When these states time out, each initiating station may then retry initiating a conversation. Further collisions will be avoided by the imposition of random delays in retransmitting.

In the event that unforeseen error conditions occur where one or more stations has determined that frames being received do not conform to the expected protocol sequences, it may be advantageous to require such stations to perform a stabilization procedure in which it transitions to, or remains in, an idle state, but is restricted from contending for the medium until a stabilization period—for instance 2WTS timeout periods—has lapsed. The same stabilization procedure may also prove advantageous for newcomers to a network.

The following section of the description of a preferred embodiment of the invention herein uses state tables to describe the processes carried out by stations employing the protocol of the invention. The following definitions are used.

| STATED | |
| --- | --- |
| IDLE | {idle, not participating, free to contend} |
| WCC | {wait for Connect confirm} |
| WTS | {waiting for a specified number of time slots to expire} |

-continued

STATED

| | |
|---|---|
| WDR | {waiting for a disconnect request} |
| WDC | {waiting for a disconnect confirm} |
| WXAK | {waiting for an XAK mac frame} |
| WRXAK | {waiting for an XAK in recovery state} |
| WXFR | {currently own the medium for reception} |
| WRXFR | {waiting for XFR in recovery state} |
| WPC | {waiting for a poll confirm} |

FRAME TYPES

| | |
|---|---|
| CR | {connect request (directed broadcast)} |
| CC | {connect confirm (directed broadcast)} |
| XFR | {data transfer (addressed)} |
| XAK | {data transfer acknowledge (addressed)} |
| DR | {disconnect request (directed broadcast)} |
| DC | {disconnect confirm (directed broadcast)} |

Each cell in a state table designates (a) the next state to be reached in response to an occurrence of an event, given the station's initial state, and (b) the steps or transitions—which are noted in "( )", e.g. "(1)"—required to move from the station's initial state to the next state-which is noted with letters (e.g. WXFR). Where more than one state name is listed in a cell (e.g. WCC, WDC), this implies alternative possibilities. Where no state name appears in a cell, and a "-" appears before the transition number (e.g. "-(7)"), this denotes that no change in state will occur in response to the event.

A (!) symbol is used to designate a directed broadcast frame received that was addressed for another node. If the (!) is not present, then the directed broadcast was addressed for the receiving node.

TABLE 2

Reservation State Table For Any Station

| | INITIAL STATE | | | | |
|---|---|---|---|---|---|
| ITEM | IDLE | WCC | WTS | WDR | WDC |
| Send Data Packet | WCC<br>IDLE (22) | –(23) | –(23) | –(23) | –(23) |
| Timeout | –(7) | WCC<br>WDC (18) | IDLE (25) | IDLE (40) | IDLE (41) |
| CR (directed) | WXFR (1) | –(2) | –(2) | –(2) | –(2) |
| CR! (directed) | WTS (5) | –(2) | –(2) | –(2) | –(2) |
| CC (directed) | –(7) | WXAK (8) | –(7) | –(7) | –(7) |
| CC! (directed) | WTS (5) | WTS (28) | –(2) | WTS (5) | WTS (5) |
| XFR (addressed) | –(7) | –(7) | –(7) | –(7) | –(7) |
| XAK (addressed) | –(7) | –(7) | –(7) | –(7) | –(7) |
| DR (directed) | –(2) | –(2) | –(7) | WTS (44) | –(7) |
| DR! (directed) | WTS (31) | –(2) | WTS (31) | –(7) | –(2) |
| DC (directed) | –(2) | –(7) | –(7) | –(7) | IDLE (43) |
| DC! (directed) | –(2) | –(2) | IDLE (43) | –(7) | –(7) |

TABLE 3

Data Transfer State Table

| EVENT | INITIAL STATE | | | | |
|---|---|---|---|---|---|
| | WXAK | WRXAK | WPC | WXFR | WRXFR |
| Send Data Packet | –(23) | –(23) | –(23) | –(23) | –(23) |
| Timeout | WPC (20) | WDC (49) | WDC (26) | WRXFR (21) | WDR (27) |
| CR (directed) | –(2) | –(2) | –(2) | –(4) | –(2) |
| CR! (directed) | –(2) | –(2) | –(2) | –(2) | –(2) |
| CC (directed) | –(7) | –(7) | –(7) | –(7) | –(7) |
| CC! (directed) | –(7) | –(7) | –(7) | WTS (5) | –(7) |
| XFR (addressed) | –(7) | –(7) | –(7) | WXFR WRXFR WDR (9) | WRXFR WDR (29) |
| XAK (addressed) | WRXAK WDC (10) | WDC (30) | –(2) | –(7) | –(7) |
| DR (directed) | –(7) | –(7) | –(7) | –(7) | –(7) |
| DR! (directed) | –(7) | –(7) | –(7) | –(7) | –(7) |
| DC (directed) | –(7) | –(7) | –(7) | –(7) | –(7) |
| DC! (directed) | –(7) | –(7) | –(7) | –(7) | –(7) |

TRANSITION DESCRIPTIONS

In the transition descriptions that follow, some global state variables are used. They are defined as follows:

```
var
    source      :ir_address;           {save of source node address}
    f           :ir_mac_frame;         {received mac frame}
    frame_mask  :word;                 {bit mask of frame segments received}
    segments_received                  {count of segments received}
    segments_expected,                 {number of segments expected}
    retry_count :integer;              {retry attempts, when in wait state}
    {buffer for reconstruction of frame during segment reception}
    rcv_buffer  :array [1..MAX_FRAME] of byte;
    {array of segments used to buffer fragmented frame ready for
    transmission}
    segmented_frame    :array [1..MAX_SEGMENTS] of segment_type;
```

TIME DEFINITIONS

The following list of timer definitions will be useful in understanding the relationship between states in both the reservation and the data transfer state tables, suggesting means of calculating appropriate values.

```
WCC_t timeout
    • WCC_t = CR_t + CC_t + IFG_t + Propagation Delay
WXAK_t timeout
    • WXAK_t = ((XFR_t + IFG_t) * segments) + XAK_t + Propagation Delay
WRXAK_t timeout
    • WRXAK_t = ((XFR_t + IFG_t) * bad frames) + XAK_t + Propagation Delay
WPC_t Timeout
    • WPC_t = PR_t + PC_t + IFG_t + Propagation Delay
WDC_t Timeout
    • WDC_t = DR_t + DC_t + IFG_t + Propagation Delay
WXFR_t Timeout
    • WXFR_t = WTS_t
WRXFR_t Timeout
    • WRXFR_t = WTS_t
WDR_t Timeout
    • WDR_t = WTS_t
WTS_t Timeout
    • WTS_t = (((XFR_t for max segment size + IFG_t) * #segments) * 3)
```

The following is a list of transmissions used in the following tables.

TRANSITION 1
```
begin
      {save source address}
       source := f.s;

{initialize reception counts etc.}
       segments_received := 0;
       segments_expected := f.ts;
       frame_mask := 0;

set_timer(XFR TIMEOUT);
      retry_count := 0;
      Send CC frame to node f.s;
      start_timer();
      next state WXFR
end
```

TRANSITION 2 ignore action/event.

TRANSITION 3
```
begin
      pass data to upper layer
      next state-
end
```

TRANSITION 4
```
begin
      if (segments_received = 0 & f.s = source)then
            {The source node did not receive our CC frame}
            stop_timer();
            Send CC frame to node f.s;
            set_timer(XFR_TIMEOUT);
            start_timer();
      else
            {This is either an interleaved CR or a hidden node
            anomaly,in either case we should ignore it}
end
```

TRANSITION 5
```
begin
      {The medium has been reserved by other node}
      set_timer(WTS timeout);
      start_timer();
      next state WTS
end
```

NOTE: The WTS timer will be a fixed Conversation time (i.e., 2 or 3 conversation times). This transition will also be used to handle the asymmetric case where I enter WXFR state thinking I have the medium and then see a (CC!). In this case I have to assume that my (CC) didn't get received and I lost the race.

TRANSITION 7
An invalid event/action has occurred, this situation should only happen if the protocol is implemented incorrectly. Log the type of error by recording the event/state.

TRANSITION 8
```
begin
        {start the XAK_timeout before we start to transmit. It will
        act as the transmits watchdog timer in case the XAK gets lost
        or our transmit fails}

Cancel CC_timer() to prevent a (CC) timeout
        set_timer(XAK_TIMEOUT);
        start_timer();

next state WXAK;

{send segments}
          for i := 1 to segment_count do
            send segmented_frame[i];
end
```

TRANSITION 9
```
begin
    stop-timer();

{Update count of segments received, copy data field}
     segments_received := segments_received + 1;
     set_bit(frame_mask, f.seq_no);
     copy(f.data, f.seq_no, rcv_buffer);

if f.seq_no = segments_expected then

{last segment of frame received send 'XAK'}
            build_frame(XAK, segments_received, frame_mask);
            send XAK frame if frame_mask = 0 then
                    copy the rcv_buffer to "link layer" queue
                    assert link layer indication
                    next state WDR
            else
                    {segments were missing, wait for retransmit}
                    set_timer(RXFR_TIMEOUT);
                    start_timer();
                    next state WXFR:
            else {still expecting more segments}
                    {remain in WXFR state}
                    set_timer(XFR_TIMEOUT);
                    start_timer();
                    next state WXFR;
end
```

TRANSITION 10
```
begin
    Cancel XAK_timer;

if f.bf = 0 then

{The transmission completed successfully. However this
            does not guarantee end to end acknowledgment}

Inform the Link Layer that the Tx completed
            Send the DR
            next state WDC
    else
            resend bad frames
            set_timer(RXAK_TIMEOUT);
            start_timer();
            next state WRXAK;
end
```

TRANSITION 18
```
begin
      {timed out waiting for CC}
      if retry_count >= MAX_CR_RETRYS then
            abandon attempt to transmit and report to upper layer
            send DR
            next state WDC
      else
            retry_count ++;
            randomize -- random back off
            resend CR
            set timer(CC_TIMEOUT);
            start_timer();
            next state WCC;
end
```

TRANSITION 20
```
begin
      {timed out waiting for XAK so try polling}
      send a Poll request frame (with bad segment field's =1)
      set_timer(PC_TIMEOUT);
      start_timer();
      next state WPC
end
```

TRANSITION 21
```
Begin
      {this is the case that we timed out while still in WXFR
      state}

NOTE: This assumes that we cannot timeout on a CC because
      even if our (CC) gets clobbered we would receive another CR
      retry before the WXFR_t expires.

start_timer();
      send an XAK packet with appropriate bad frames field
      next state WRXFR
end
```

TRANSITION 22
```
begin
    {a frame is received from the link layer, prepare it for
    xmit}
    fragment_link_frame(lf, segmented_frame, segment-count);

if (f.type = MR) then
        build_frame(MR + data);
        send MR frame
        next state IDLE
    else
        build_frame(CR);
        send CR frame
        set_timer(CC_TIMEOUT);
        start_timer();
        next state WCC
end
```

TRANSITION 23
```
Queue the Mac tx request
next state (same)
```

TRANSITION 25
```
begin
    next state IDLE
end
```

TRANSITION 26
```
begin
    {timed out waiting for PC}
    abandon attempt to transmit this frame and report to upper
layer
    Send DR
    next state WDC
end
```

TRANSITION 27
```
begin
    {Timeout while in recovery state}
    abort the frame and log the error
    next state WDR
end
```

TRANSITION 28
```
begin
        cr_retry ++ if (CR_retry > max_CR_retry) then
                abort transmit and report to upper layer set_timer(WTS_Timeout)
        start_timer();
        next state WTS
end
```

TRANSITION 29
```
begin
        stop_timer();

{Update count of segments received, copy data field}
        segments_received := segments_received + 1;
        set_bit(frame_mask, f.seq_no);
        copy(f.data, f.seq_no, rcv_buffer);

if f.seq_no = segments_expected then

{last segment of frame received send 'XAK'}
                build_frame(XAK, segments_received, frame_mask);
                send XAK frame
                (NOTE: This ack is only being sent for statistics)

if frame_mask = 0 then
                        copy the rcv_buffer to the "to link layer" queue
                else
                        {segments missing}
                        Log the errors next state WDR else {still expecting more segments}
                {remain in WRXFR state}
                set_timer(RXFR_TIMEOUT);
                start_timer();
                next state WRXFR;
end
```

TRANSITION 30
```
begin
     stop_timer();

if f.bf = 0 then
          {recovery transmission completed successfully}
          Inform the Link Layer that the Tx completed and that
          the reservation has finished. This XAK DOES NOT indicate
          any type of end to end acknowledgment.
     else
          {retry failed so we need to abort}
          Abort Tx and report to Link layer Send DR
     next state WDC end
```

TRANSITION 31
```
begin

Set (DC_Timeout)
     start -timer()
     next state WTS end
```

TRANSITION 40
```
begin
     {timed out waiting for the Disconnect Req (DR)}
     send (DC) for the sake of hidden stations
     next state IDLE
end
```

TRANSITION 41
```
begin timed out waiting for Disconnect Confirm (DC)
     next state IDLE
end
```

TRANSITION 42
```
begin
     {The source node must not have received the XAK bf=0}
     send PC bf=0
     set timer to (DR_TIMEOUT)
     start timer
end
```

TRANSITION 43
begin
    Reservation has finished
    cancel the timer
    next state IDLE Note: Nodes which can see the (DR!) must wait a short WDC_T
    Timeout) before doing the transition to IDLE
end

TRANSITION 44
begin
    Cancel Timer
    send (DC)
    set timer (2 interframe gaps)
    start timer
    next state WTS
end

TRANSITION 46
begin
    Received a PR while still in WXFR state.
    The last segment must have been lost or our XAK was lost,
    We can't ignore the PR so we must process it.

send PC w/ bf=bad segment count
    set timer (RXFR_TIMEOUT)
    start timer
    next state WRXFR
end

TRANSITION 48
begin
    Stop timer
    resend bad segments
    set timer (RXAK_TIMEOUT)
    start timer
    next state WRXAK
end

TRANSITION 49
begin
    abort tx request report to the upper layer
    next state WDC
end

EXAMPLES OF CONVERSATIONS USING THE PREFERRED EMBODIMENT OF THE INVENTION

This section provides a temporal view of how common conversations may progress through the defined state tables. This list of examples is not meant to be exhaustive, but to be representative of typical conversations.

Figure 6:
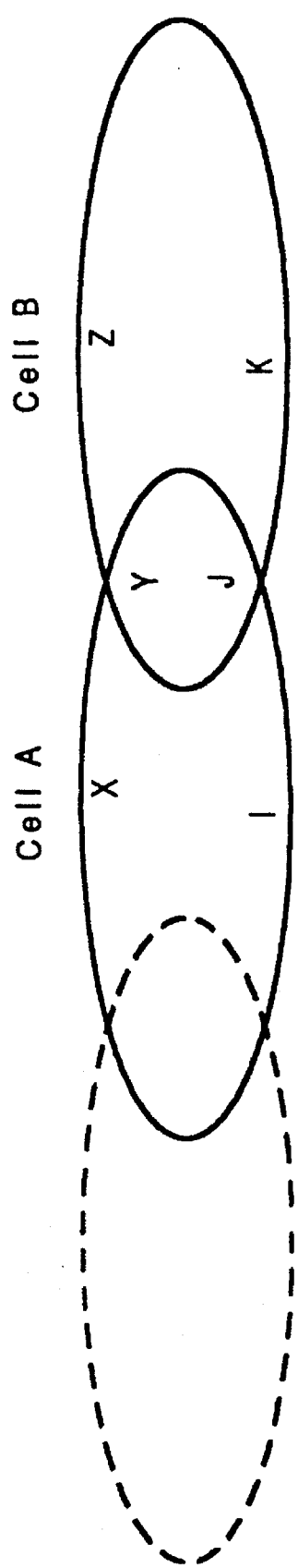
FIG. 6 is a drawing depicting typical communication networks that are partially overlayed and have partially hidden stations.

The scenarios in this section assume that CR, CC, DR and DE frames are directed broadcast frames. All other frames, XFR, and XAK, are addressed and are not processed by a station unless the destination address matches the station's address. FIG. 6 shows the network and station relationships used in the scenario examples and Table 4 gives a brief explanation on how to read the scenario tables and what the fields in the columns mean.

TABLE 4

Example Table: Definition of Table nomenclature used in following tables.

| STATION X | | STATION Y | | NEXT |
|---|---|---|---|---|
| State | Queue | State | Queue | FRAME/ACTION |
| Station X: Current State Where the state includes a subscript character, the subscript indicates the station from which the frame is expected. As an example, $WXFR_Y$ means X is expecting to receive a WXFR frame from Y. (T-n) Next Transition to perform given the Station X's current state and its next frame in the queue. Based on transition definitions in protocol specification. | Station X: FIFO queue of received frames. All frames are shown in 4-character codes. As an example XcrY is a CR frame sent from X and addressed to Y. | Station Y: Current State Where the state includes a subscript character, the subscript indicates the station from which the frame is expected. As an example, $WXFR_X$ means Y is expecting to receive a WXFR frame from X. (T-n) Next transition to perform given the Station Y's current state and its next frame in the queue. Based on transition definitions in protocol specification. | Station Y: FIFO queue of received frames. All frames are shown in 4-character codes. As an example XcrY is a CR frame sent from X and addressed to Y. | Next Frame/Action: Input stimuli for current state. Frame being transmitted or action occurring. |

SINGLE NETWORK RACE CONDITIONS 2

At this point the race condition is resolved and the conversation will end normally.

session between X and Y will continue through xfr's and XAK to completion. Station I's WTS_t timer will pop and it will move into an Idle state.

TABLE 7

Single Network Race Condition #2. Station X sends to Station Y at the same time Station Y sends to X.

| Station X | | Station Y | | Station _ | | Station _ | | Next |
|---|---|---|---|---|---|---|---|---|
| State | Queue | State | Queue | State | Queue | State | Queue | Frame/Action |
| Idle | — | Idle | — | | | | | |
| WCC | — | Idle | — | | | | | XcrY |
| WCC | — | WCC (T-2) | XcrY | | | | | YcrX |
| WCC (T-2) | YcrX | WCC | — | | | | | |
| WCC | — | WCC | — | | | | | |

At this point both stations stay in WCC mode until the WCC_t timeout occurs. Then they will backoff off for different random time periods before resending their cr's. The node with the shorter backoff will get the medium for transmission.

TABLE 8

Single Network Race Condition #3. Station X sends to Station Y at the same time Station I sends to Y.

| Station X | | Station Y | | Station I | | Station _ | | Next |
|---|---|---|---|---|---|---|---|---|
| State | Queue | State | Queue | State | Queue | State | Queue | Frame/Action |
| Idle | — | Idle | — | Idle | — | | | |
| WCC | — | Idle | — | Idle | — | | | XcrY |
| WCC | — | Idle (T-1) | XcrY | WCC (T-2) | XcrY | | | IcrY |
| WCC (T-2) | IcrY | WXFR$_X$ (T-2) | IcrY | WCC | — | | | YccX |
| WCC (T-8) | YccX | WXFR$_X$ | — | WCC (T-5) | YccX | | | |
| WXAK$_Y$ | — | WXFR$_X$ | — | WTS | — | | | XxfrY |

At this point the contention has been resolved and the

TABLE 9

| Station X | | Station Y | | Station I | | Station _ | | Next |
|---|---|---|---|---|---|---|---|---|
| State | Queue | State | Queue | State | Queue | State | Queue | Frame/Action |
| Single Network Race Condition #4. Station X sends to Station Y at the same time Station Y sends to I. | | | | | | | | |
| Idle | — | Idle | — | Idle | — | | | |
| WCC | — | Idle | — | Idle | — | | | XcrY |
| WCC | — | WCC (T-2) | XcrY | Idle (T-5) | XcrY | | | YcrI |
| WCC (T-2) | YcrI | WCC | — | WTS (T-2) | YcrI | | | |
| WCC | — | WCC | — | WTS | — | | | X-WCC_t Timeout |
| WDC | — | WCC | — | WTS | — | | | XdrY |
| Whole bunch of interleaved XdrY and YdrI requests up to MAX_RETRIES | | | | | | | | |
| WDC | — | WCC (T-2) | XdrY | WTS (T-31) | — | | | Y-WCC_t Timeout |
| WDC | — | WDC | — | WTS | — | | | YdrI |
| WDC (T-2) | YdrI | WDC | — | WTS (T-2) | YdrI | | | X-WDC_t Timeout<br>I-WTS_t Timeout |
| WDC | — | WDC | — | WTS | — | | | Y-WDC_t Timeout |

TABLE 9-continued

| Station X | | Station Y | | Station I | | Station _ | | Next |
|---|---|---|---|---|---|---|---|---|
| State | Queue | State | Queue | State | Queue | State | Queue | Frame/Action |
| (T-41) | | | | (T-25) | | | | |
| Idle | — | WDC | — | Idle | — | | | |
| | | (T-41) | | | | | | |
| Idle | — | Idle | — | Idle | — | | | |

TABLE 10

Single Network Race Condition #5. Station Y sends to Station I at the same time Station X sends to Y.

| Station X | | Station Y | | Station I | | Station _ | | Next |
|---|---|---|---|---|---|---|---|---|
| State | Queue | State | Queue | State | Queue | State | Queue | Frame/Action |
| Idle | — | Idle | — | Idle | — | | | |
| Idle | — | WCC | — | Idle | — | | | YcrI |
| WCC | YcrI | WCC | — | Idle | YcrI | | | XcrY |
| (T-2) | | | | (T-1) | | | | |
| WCC | — | WCC | XcrY | WXFR$_Y$ | XcrY | | | IccY |
| | | (T-2) | | (T-2) | | | | |
| WCC | IccY | WCC | IccY | WXFR$_Y$ | — | | | |
| (T-28) | | (T-8) | | | | | | |
| WTS | — | WXAK$_I$ | — | WXFR$_Y$ | — | | | Yxfrl |

At this point the contention has been resolved and the session between Y and I will continue normally to completion.

HIDDEN STATION RACE CONDITIONS

TABLE 11

Hidden Station Race Condition #1. Station Y receives cr's from Station X and Z (where X and Z are hidden from each other).

| Station X | | Station Y | | Station Z | | Station _ | | Next |
|---|---|---|---|---|---|---|---|---|
| State | Queue | State | Queue | State | Queue | State | Queue | Frame/Action |
| Idle | — | Idle | — | Idle | — | | | |
| WCC | — | Idle | — | Idle | — | | | XcrY |
| WCC | — | Idle | YcrY | WCC | — | | | ZcrY |
| | | (T-1) | | | | | | |
| WCC | — | WXFR$_X$ | ZcrY | WCC | — | | | YccX |
| | | (T-4) | | | | | | |
| WCC | YccX | WXFR$_X$ | | WCC | YccX | | | |
| (T-8) | | | | (T-28) | | | | |
| WXAK$_Y$ | — | WXFR$_X$ | — | WTS | — | | | |

At this point the contention has been resolved and the session between X and Y will continue through xfr's and XAK to completion. Station Z will eventually hear the YdeX or its WTS_t timer will pop. In either case it will move into an Idle state.

TABLE 12

Hidden Station Race Condition #2. Station Y sends CR to Z and X sends CR to Y (where X and Z are hidden from each other and YcrZ wins the race condition).

| Station X | | Station Y | | Station Z | | Station _ | | Next |
|---|---|---|---|---|---|---|---|---|
| State | Queue | State | Queue | State | Queue | State | Queue | Frame/Action |
| Idle | — | Idle | — | Idle | — | | | |
| Idle | — | WCC | — | Idle | — | | | YcrZ |
| WCC | YcrZ | WCC | — | Idle | YcrZ | | | XcrY |
| (T-2) | | | | (T-1) | | | | |

TABLE 12-continued

Hidden Station Race Condition #2. Station Y sends CR to Z and X sends CR to Y (where X and Z are hidden from each other and YcrZ wins the race condition).

| Station X | | Station Y | | Station Z | | Station _ | | Next |
|---|---|---|---|---|---|---|---|---|
| State | Queue | State | Queue | State | Queue | State | Queue | Frame/Action |
| WCC | — | WCC (T-2) | XcrY | WXFR$_Y$ | — | | | ZccY |
| WCC | — | WCC (T-8) | ZccY | WXFR$_Y$ | — | | | |
| WCC | — | WXAK$_Z$ | — | WXFR$_Y$ | — | | | YxfrZ |
| WCC (T-18) | — | WXAK$_Z$ | — | WXFR$_Y$ (T-9) | YxfrZ | | | WCC_t Timeout XcrY |
| WCC | — | WXAK$_Z$ (T-2) | XcrY | WXFR$_Y$ (T-9) | YxfrZ | | | ZxakY bf=0 |
| WCC | — | WXAK$_Z$ (T-10) | ZxakY | WDR | — | | | YdrZ |
| WCC[1] | YdrZ | WDC | — | WDR (44) | YdrZ | | | |
| WCC | — | WDC | — | WTS | — | | | ZdcY |
| WCC | — | WDC | ZdcY | WTS | — | | | |
| WCC | — | IDLE | — | IDLE | — | | | |

Note: [1]X will eventually timeout while in the WCC state & resend its XcrY. It will eventually establish a session with Y or exceed the maximum number of retries and give up (move into Idle).

TABLE 13

Hidden Station Race Condition #3. Station X sends CR to Station Y just as Station Z sends CR to Station J (where X and Z are hidden from each other).

| Station X | | Station Y | | Station Z | | Station J | | Next |
|---|---|---|---|---|---|---|---|---|
| State | Queue | State | Queue | State | Queue | State | Queue | Frame/Action |
| Idle | — | Idle | — | Idle | — | Idle | — | |
| WCC | — | WCC | — | Idle | — | Idle | — | XcrY |
| WCC | — | Idle (T-1) | XcrY | WCC (T-2) | XcrY | Idle (T-5) | XcrY | ZcrJ |
| WCC | — | WXFR$_X$ (T-2) | ZcrJ | WCC | — | WTS (T-2) | ZcrJ | YccX |
| WCC (T-8) | YccX | WXFR$_X$ | — | WCC (T-5) | — | WTS (T-2) | YccX | |
| WXAK$_Y$ | — | WXFR$_X$ | — | WTS | — | WTS | — | |

At this point the contention has been resolved and the session between X and Y will continue through xfr's and XAK to completion. Station Z's and Station J's WTS_t timer will pop and they will move into an Idle state.

TABLE 14

Hidden Station Race Condition #4 Station Y sends to Station X at the same time Station J sends to Station Z.

| Station X | | Station Y | | Station Z | | Station J | | Next |
|---|---|---|---|---|---|---|---|---|
| State | Queue | State | Queue | State | Queue | State | Queue | Frame/Action |
| Idle | — | Idle | — | Idle | — | Idle | — | |
| Idle | — | WCC | — | Idle | — | Idle | — | YcrX |
| Idle (T-1) | YcrX | WCC | — | Idle (T-5) | YcrX | WCC (T-2) | YcrX | JcrZ |
| WXFR$_Y$ (T-2) | JcrZ | WCC (T-2) | JcrZ | WTS (T-2) | JcrZ | WCC | — | XccY |
| WXFR$_Y$ | — | WCC (T-8) | XccY | WTS (T-2) | XccY | WCC (T-28) | XccY | |
| WXFR$_Y$ | — | WXAK | — | WTS | — | WTS | — | YxfrX |
| WXFR$_Y$ (T-9) | YxfrX | WXAK | — | WTS | — | WTS | — | XxakY |
| WDR$_Y$ | — | WDC$_X$ (T-10) | XxakY | WTS | — | WTS | — | YdrX |
| WDR$_Y$ (T-44) | Ydr$_X$ | WDC$_X$ | — | WTS (T-31) | YdrX | WTS (T-31) | YdrX | XdcY |
| WTS | — | WDC$_X$ (T-43) | XdcY | WTS | — | WTS (T-43) | XdcY | X,Z,J WTS_t Timeout |
| Idle | — | Idle | — | Idle | — | Idle | — | |

HIDDEN STATION COLLISION CONDITIONS

TABLE 15

Hidden Station Collision Condition #1. Station X sends CR to Station Y at the same time Station Y sends CR to Station Z (where X and Z are hidden from each other).

| Station X | | Station Y | | Station Z | | Station J | | Next |
|---|---|---|---|---|---|---|---|---|
| State | Queue | State | Queue | State | Queue | State | Queue | Frame/Action |
| Idle | — | Idle | — | Idle | — | Idle | — | |
| WCC | — | WCC | — | Idle | — | Idle | — | XcrY YcrZ |
| WCC | * | WCC | * | Idle (T-1) | YcrZ | Idle | * | |
| WCC | — | WCC | — | WXFR$_Y$ | — | Idle | — | ZccY |
| WCC | — | WCC (T-8) | ZccY | WXFR$_Y$ | — | Idle (T-5) | ZccY | |
| WCC (T-18) | — | WXAK$_Z$ | — | WXFR$_Y$ | — | WTS | — | WCC_t Timeout[1] XcrY |
| WCC | — | WXAK$_Z$ (T-2) | XcrY | WXFR$_Y$ | — | WTS (T-2) | XcrY | YxfrZ |
| WCC | — | WXAK$_Z$ | — | WXFR$_Y$ (T-9) | YxfrZ | WTS | — | ZxakY |
| WCC | — | WXAK$_Z$ | ZxakY | Idle | — | WTS | — | |
| WCC | — | Idle | — | Idle | — | WTS | — | WTS_t Timeout |
| WCC | — | Idle | — | Idle | — | Idle | — | |
| WCC[2] | — | Idle | — | Idle | — | Idle | — | |

Note: *denotes collision of CR frames
Note: [1]Note that the actual timing of the WCC_t Timeout is irrelevant to the final outcome of the scenario (assuming the resend of the XcrY does not cause a collision). The XcrY is ignored by all Stations and Station X goes back into WCC.
Note: [2]X will eventually timeout while in the WCC state & resend its XcrY. It will eventually establish a session with Y or exceed the maximum number of retries and give up (move into Idle).

While the invention has been particularly shown and described with reference to a preferred embodiment, it will be understood by those skilled in the art that various changes in form and detail may be made therein without departing from the spirit and scope of the invention.

What is claimed is:

1. A method for controlling access to a communication medium intended for sharing by at least two stations for peer-to-peer communications therebetween, said method comprising the steps of:

sensing said communication medium at a first station to determine if said communication medium is in use;

transmitting a connection request message from said first station to a second station if said first station determines that said communication medium is not in use;

transmitting a connection confirm message from said second station to said first station for temporarily reserving said communication medium for use by only said first and second stations;

transmitting data messages from said first station to said second station;

transmitting an acknowledgement message from said second station to said first station in response to said second station receiving a last one of said data messages;

transmitting a disconnect request message from said first station to said second station in response to receiving said acknowledgement message; and transmitting a disconnect confirm message from said second station to said first station in response to receiving said disconnect request message for terminating said reservation of said communication medium.

2. The method according to claim 1 further including the step of placing a third station in a wait state until the occurrence of a predetermined event, wherein said third station is restrained from transmitting messages on said communication medium while in said wait state.

3. The method according to claim 2 further including the step of maintaining said wait state until said third station detects termination of said reservation of said communication medium, or until a wait state timer expires.

4. The method according to claim 3 further including the step of maintaining said wait state until said wait state timer expires, or until said third station detects either said disconnect request message or said disconnect confirm message.

5. The method according to claim 2 further including the step of placing said third station in an idle state from said wait state in response to the occurrence of said predetermined event.

6. The method according to claim 1 wherein said data messages include sequence information for identifying said data messages, and wherein said step of transmitting data messages from said first station to said second station includes transmitting data messages having said sequence information from said first station to said second station.

7. The method according to claim 6 wherein said sequence information includes a total number of said data messages to be transmitted from said first station to said second station.

8. The method according to claim 7 further including the step of identifying, within said second station, a last data message by utilizing said sequence information.

9. The method according to claim 1 further including the step of placing each station accessing said communication medium in a state in which it is free to secure a reservation of said communication medium, in response to termination of said reservation by said first and second stations.

10. The method according to claim 9 wherein said step of placing each station accessing said communication medium in a state in which it is free to secure a reservation of said communication medium, in response to termination of said reservation by said first and second stations includes placing each station accessing said communication medium in a state in which it is free to secure a reservation of said communication medium, in response to termination of said reservation by said first and second stations, and expiration of a preselected period of time preselected for each station.

11. The method according to claim 10 wherein said preselected period of time includes a random delay.

12. A communications system for controlling access to a communication medium intended for sharing by at least two stations for peer-to-peer communications therebetween, said communications system comprising:

means for sensing said communication medium at a first station to determine if said communication medium is in use;

means for transmitting a connection request message from said first station to a second station if said first station determines that said communication medium is not in use;

means for transmitting a connection confirm message from said second station to said first station for temporarily reserving said communication medium for use by only said first and second stations;

means for transmitting data messages from said first station to said second station;

means for transmitting an acknowledgement message from said second station to said first station in response to said second station receiving a last one of said data messages;

transmitting a disconnect request message from said first station to said second station in response to receiving said acknowledgement message; and transmitting a disconnect confirm message from said second station to said first station in response to receiving said disconnect request message for terminating said reservation of said communication medium.

13. The communications system according to claim 12 further including means for placing a third station in a wait state until the occurrence of a predetermined event, wherein said third station is restrained from transmitting messages on said communication medium while in said wait state.

14. The communications system according to claim 13 further including means for maintaining said wait state until said third station detects termination of said reservation of said communication medium, or until a wait state timer expires.

15. The communications system according to claim 14 further including means for maintaining said wait state until said wait state timer expires, or until said third station detects either said disconnect request message or said disconnect confirm message.

16. The communications system according to claim 13 further including means for placing said third station in an idle state from said wait state in response to the occurrence of said predetermined event.

17. The communications system according to claim 12 wherein said data messages include sequence information for identifying said data messages, and wherein said means for transmitting data messages from said first station to said second station includes means for transmitting data messages having said sequence information from said first station to said second station.

18. The communications system according to claim 17 wherein said sequence information includes a total number of said data messages to be transmitted from said first station to said second station.

19. The communications system according to claim 18 further including means for identifying, within said second station, a last data message by utilizing said sequence information.

20. The communications system according to claim 12 further including means for placing each station accessing said communication medium in a state in which it is free to secure a reservation of said communication medium, in response to termination of said reservation by said first and second stations.

21. The communications system according to claim 20 wherein said means for placing each station accessing said communication medium in a state in which it is free to secure a reservation of said communication medium, in response to termination of said reservation by said first and second stations includes means for placing each station accessing said communication medium in a state in which it is free to secure a reservation of said communication medium, in response to termination of said reservation by said first and second stations, and expiration of a preselected period of time preselected for each station.

22. The communications system according to claim 21 wherein said preselected period of time includes a random delay.

* * * * *